Jan. 24, 1967 P. JEANLIN 3,300,584

TWO-WAY TELEPHONE COMMUNICATION SYSTEM

Filed April 3, 1963 3 Sheets-Sheet 1

United States Patent Office 3,300,584
Patented Jan. 24, 1967

3,300,584
TWO-WAY TELEPHONE COMMUNICATION SYSTEM

Pierre Jeanlin, Lesmureaux, France, assignor to Neophone France, a corporation of France
Filed Apr. 3, 1963, Ser. No. 270,261
Claims priority, application France, Apr. 11, 1962, 894,172
5 Claims. (Cl. 179—1)

The present invention relates to two-way telephone communication systems in which the interaction between the transmission line and the reception line risks to cause annoying effects not eliminated or not completely eliminated by devices such as hybrid transformers, for instance, with which these systems may be provided.

In some of these systems it is common to cut off the idle line by biassing the control grid of one of the tubes of the corresponding amplifier by means of a voltage deriving from the current of the line in action.

This solution is not satisfactory in all cases and—more particularly, but not exclusively—when transistor amplifiers are used: due to the fact that the input circuit of the latter often has a law impedance, the derivation of the current required for cutting off the line entails an important perturbation on the other line, and certain problems such as the provision of appropriate time constants are difficult to solve in practice.

It is an object of the present invention to do away with this sort of inconvenience by blocking the unbusy line without interfering in the circuit of the amplifier, by shortcircuiting the signal at the input end of the said amplifier by means of a photoconductive cell of which the resistance is controlled by means of a light source which is fed by a current derived from the speech signal.

This and other objects of the invention will become clearly apparent from the following description and the accompanying drawings.

Figure 1:
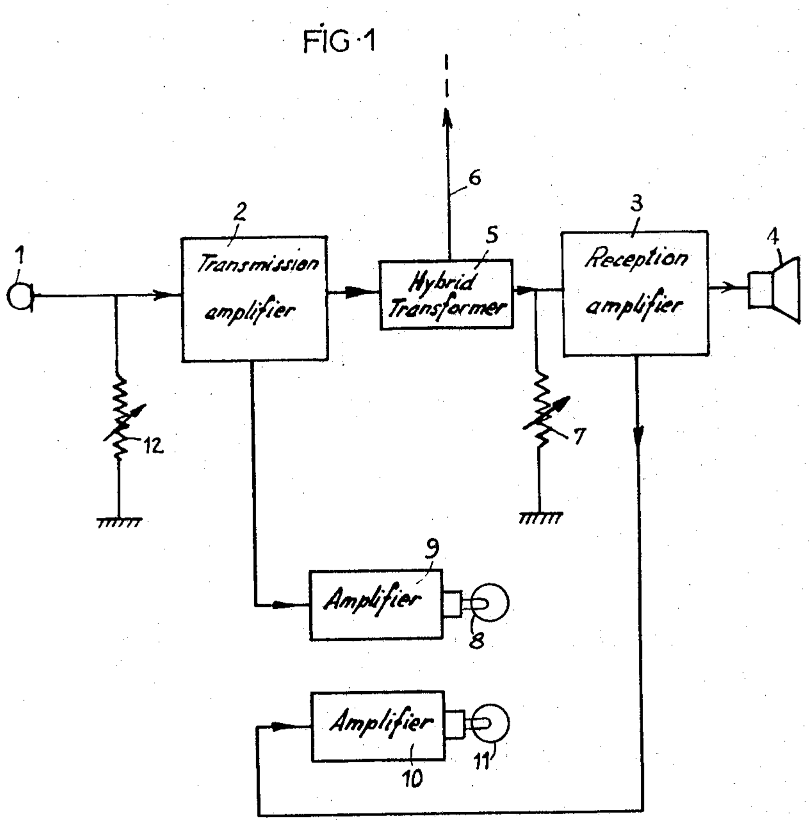
FIGURE 1 is a block diagram of a two-way telephone connection according to the invention.

In FIGURE 1, there is diagrammatically shown one of the stations of a telephone connection. The transmitter consists of a microphone 1 and an amplifier 2, and the receiver of an amplifier 3 and a telephone receiving set 4. A hybrid transformer 5 translates the speech signal from amplifier 2 to line 6 and also translates the speech signal received from line 6 to amplifier 3.

It may occur that a signal, the amplitude of which is not negligible, is further directly translated from the transmission channel to the reception channel: this signal is liable to generate a Larsen effect on account of the acoustic feedback between the microphone and the receiver 4 (especially in case the latter is a loudspeaker).

The present invention aims at completely blocking the reception channel during the speech transmission time, in the following way:

A photoconductive cell 7 is connected in parallel across the input of amplifier 3. This cell is placed within a normally dark space (inside the box of the device) and possesses a very high resistance (for instance of the order of one megohm for a cadmium sulphide cell) so that it then has no effect whatsoever on the reception channel.

As soon as a microphone current is applied at the input of amplifier 2, part of this current flows through incandescent bulb 8, preferably by means of an amplifier arrangement 9. Cell 7 is then illuminated and its resistance drops to a few ohms or some dozens of ohms. The result is that the reception amplifier 3 is practically shortcircuited.

In turn, the incandescent bulb 11 is fed, via amplifier 10, on receipt of a signal at the input of amplifier 3, so that the photoconductive cell 12 is then shortcircuiting the transmission channel.

It is emphasized that this method requires no critical adjustment of the arrangement as to function of temperature or other operating conditions.

Figure 2:
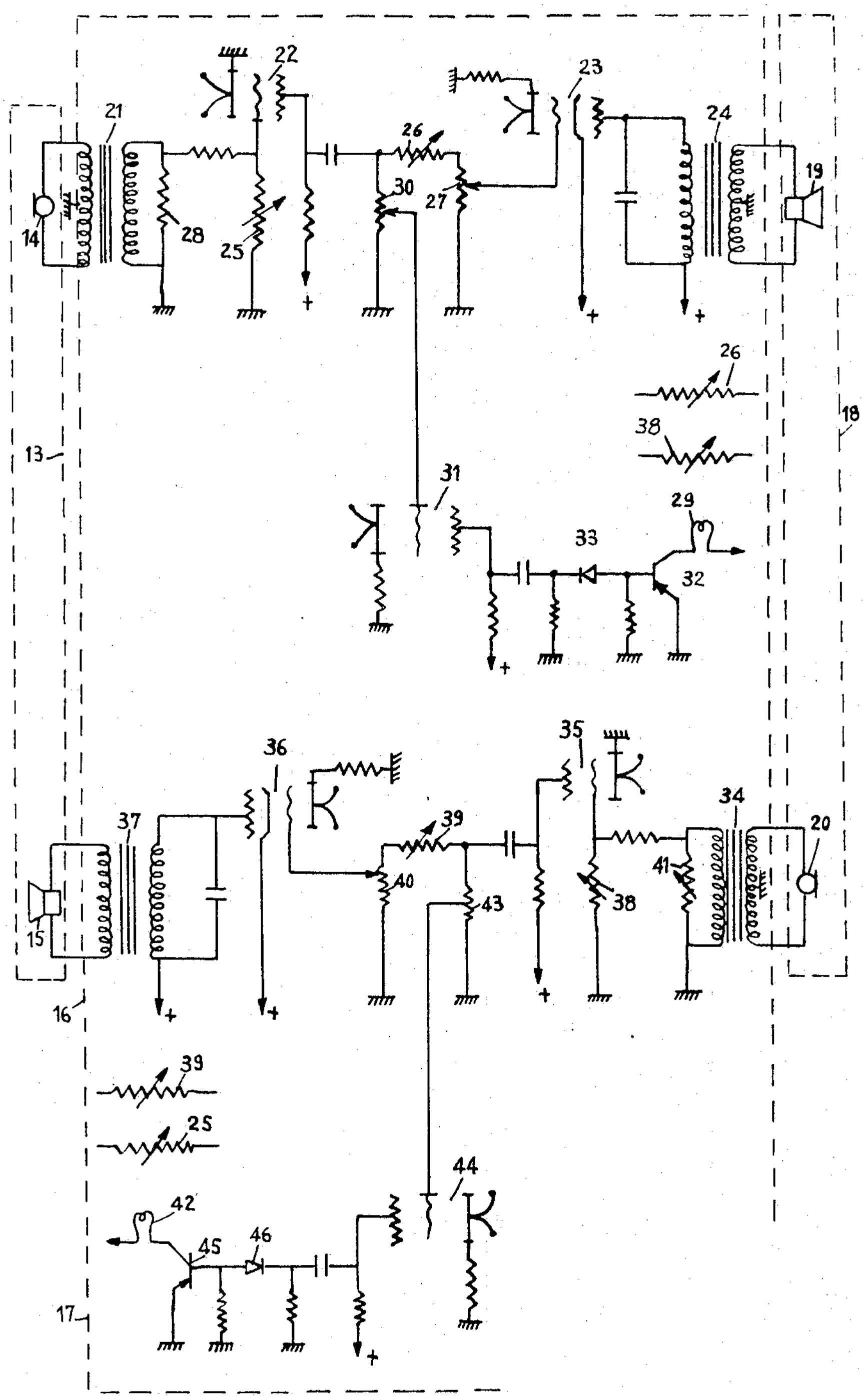
FIGURE 2 is a circuit diagram of a loudspeaker/intercommunication telephone constituting an embodiment of the invention.

In FIGURE 2 is shown an intercommunication telephone liaison of which one of the sets 13 consists of a microphone 14 and a loudspeaker 15, linked respectively by the line with two amplifiers placed within a box 17, and of which the other set 18 consists of a loudspeaker 19 and a microphone 20, also linked by said line with the two amplifiers.

A first amplifier, the input of which is connected to a transformer 21 which has its primary winding connected to microphone 14, essentially consists of two amplifying elements 22 and 23 which are electron tubes in the nonlimitative example described. The amplifier's output is connected to a transformer 24 which drives loudspeaker 19.

This amplifier will not be described in detail; it is sufficient to indicate that, according to this invention, a first photoconductive cell 25 connects the control grid of tube 22 to the earth, while a second photoconductive cell 26 forms a voltage divider with a potentiometer 27, the slider of which is connected to the control grid of tube 23.

Moreover, an incandescent bulb 29 is fed by a current deriver from a potentiometer 30 at the output of tube 22 and amplified by an amplifying arrangement consisting of a tube 31 and a transistor 32 connected together by means of a circuit comprising a diode 33.

According to another feature of this invention, a third photoconductive cell 28 will preferably be connected in parallel across the secondary winding of transformer 21.

Also, a second amplifier, the input of which is connected to a transformer 34 having its primary winding linked to microphone 20, essentially consists of two amplifying elements 35 and 36. Its output is connected to a transformer 37 which drives loudspeaker 15.

According to the invention, a first photoconductive cell 38 connects the control grid of tube 35 to the earth, whereas a second photoconductive cell 39 forms a voltage divider with a potentiometer 40, of which the slider is linked to the control grid of tube 36.

According to a specific feature of this invention, a third photoconductive cell 41 will preferably be arranged in parallel across the secondary winding of transformer 34. Besides, an incandescent bulb 42 is fed by a current derived from a potentiometer 32 at the output of tube 35, and amplified by a tube 44 and a transistor 45, the two linked together by means of a circuit comprising a diode 46.

Bulb 29 enlightens cells 26 and 38 while bulb 42 enlightens cells 25 and 39.

The operation of the arrangement just described is as follows: when the microphone 14 is operating, bulb 29 is fed and consequently the resistance of cells 26 and 38 becomes very low. It follows that the tube 35 is shortcircuited by cell 38, that the second amplifier is blocked and that the acoustic feedback between loudspeaker 19 and microphones 20 is unable to generate any Larsen effect.

It is to be notified that—according to an additional feature of the invention, not illustrated in FIGURE 1—from the fact that resistance 26 drops to a low value, it results that the voltage applied to the control grid of tube 23 is considerably increased. The amplification of the operating channel then obtains its optimum value.

Also, when the microphone 20 is operating, channel (14–19) is blocked due to the sharp decrease of resistance 39.

Cells 28 and 41 are apt to ensure regulation of the output level of the amplifiers in the following manner: to this effect, a light bulb especially appropriated for this purpose and fed via a circuit connected to the output of the amplifier, lights up when the output level rises above the value to which it is desired to restrict it; this bulb thus eliminates the corresponding regulation cell which partly derives the signal applied at the input of the amplifier, thus reducing the output level.

Figure 3:
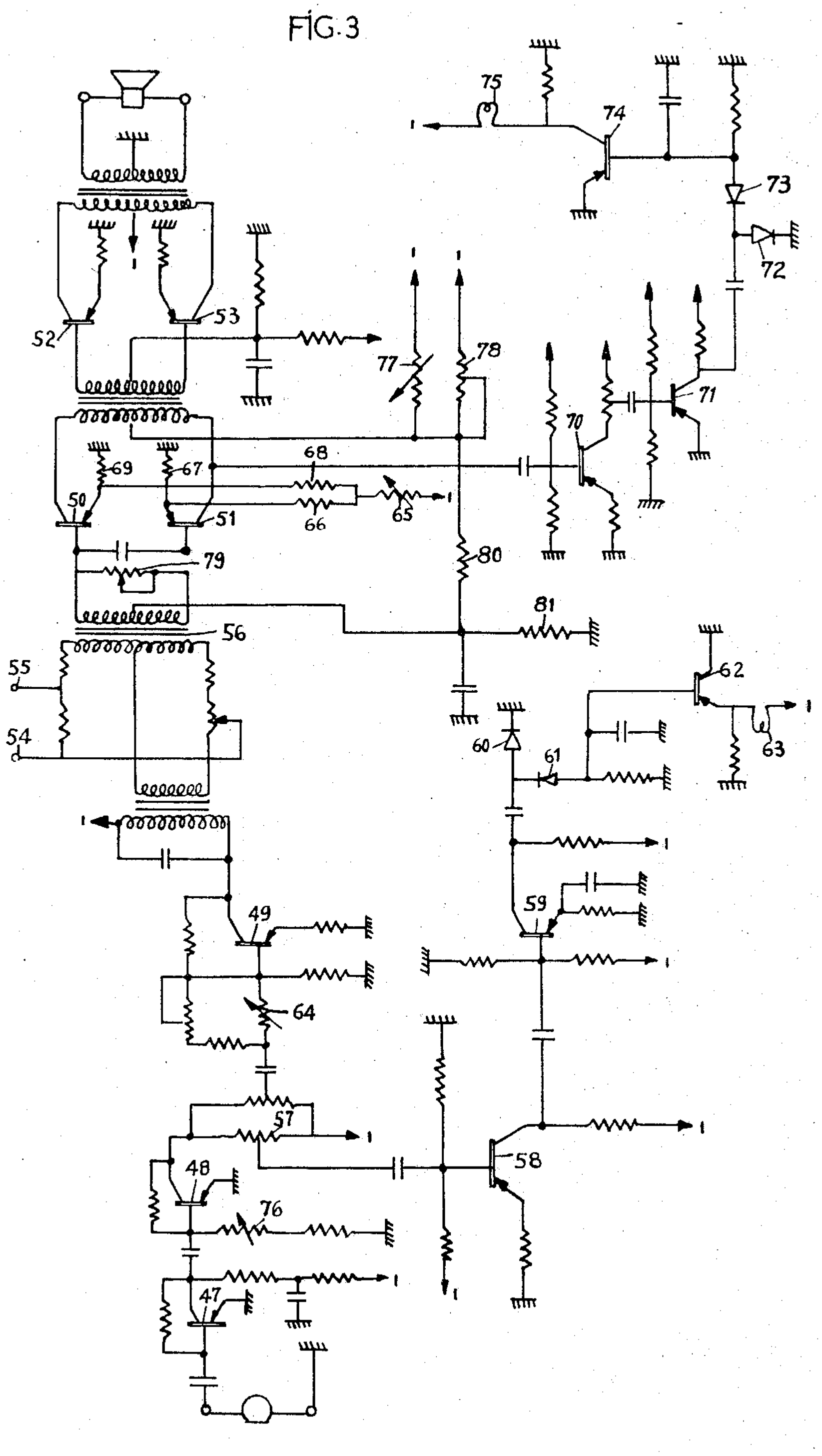
FIGURE 3 is a circuit diagram of a two-way telephone communication system in which the amplifiers are transistorized.

In FIGURE 3, a transmission amplifier is shown, essentially consisting of transistors 47 to 49; there is also shown a reception amplifier, essentially consisting of transistors 50 to 53. The line 54–55 is connected to these two amplifiers by means of a hybrid transformer 56.

As soon as the speech signal appears at the input of the transmission amplifier, the voltage generated at the tapping point of a potentiometer 57 connected in the collector circuit of transistor 48, is applied to two transistor amplifiers 58–59 arranged in series and, after amplification, is detected by two diodes 60–61.

The detected current biasses a transistor 62 in an appropriate direction for causing it to conduct, so that a light bulb 63, connected in the collector circuit of said transistor lights up. This bulb enlightens two photoconductive cells 64 and 65. The resulting drop of the resistance of cell 65 has the effect of modifying by means of resistance bridges 66–67 and 68–69, the bias of the respective emitters of the two transistors 51 and 50, in a direction appropriate for cutting off the current in these transistors and, therefore, in the reception channel.

Moreover, the resistance drop of cell 64 has the effect of increasing the amplitude of the signal applied to transistor 49 and, consequently, the signal transmitted on the line.

The invention provides for a similar arrangement at the reception end, which operates in the following manner: as soon as the speech signal coming from the line is applied at the input of the reception amplifier, a voltage is applied to an amplifier consisting of two transistors 70 and 71, this voltage being taken from the collector of transistor 51. The amplified voltage is detected by two diodes 72–73 and causes a transistor 74 to conduct so that a bulb 75 lights up. This bulb enlightens two photoconductive cells 76 and 77. The resistance drop of cell 76 cuts off the current in transistor 48, i.e. in the transmission amplifier, while the resistance drop of cell 77 has the effect with the help of potentiometers 78 and 79 and resistances 80 and 81, of increasing the signal applied to two transistors 50 and 51 arranged in "push-pull."

It is to be understood that those skilled in the art will easily imagine variations and modifications of the arrangements described, without departing from the scope and spirit of this invention, as defined in the appended claims:

What we claim is:

1. A two-way telephone communication system comprising: a transmission set; a transmission amplifier having an input connected to said transmission set; a first photoconductive cell connected in parallel across said input; a telephone line, said transmission amplifier connecting said transmission set to said telephone line; a reception set; a reception amplifier having an input; a second photoconductive cell connected in parallel across the input of the reception amplifier, said reception amplifier connecting the telephone line to said reception set; first and second light sources respectively positioned for directing their light on said first and second photoconductive cells; means, connected to said reception amplifier, for controlling the operation of said first light source; means, connected to said transmission amplifier, for controlling the operation of said second light source.

2. A two-way telephone communication system comprising: a transmission set; a transmission amplifier having an input connected to said transmission set; a first photoconductive cell connected in parallel across said input; a telephone line, said transmission amplifier connecting said transmission set to said telephone line; a reception set; a reception amplifier having an input; a second photoconductive cell connected in parallel across the input of the reception amplifier, said reception amplifier connecting the telephone line to said reception set; first and second incandescent bulbs respectively positioned for directing their light on said first and second photoconductive cells; circuit means, connecting said reception amplifier to said first incandescent bulb, and circuit means connecting said transmission amplifier to said second incandescent bulb.

3. A two-way telephone communication system comprising: a microphone; a first transformer having a primary winding connected to said microphone, and a secondary winding; a transmission amplifier comprising first and second amplifying elements, said first amplifying element having a control electrode connected to said secondary winding; first circuit means connecting said first amplifying element to said second amplifying element; a telephone line; a second transformer connecting said second amplifying element to said telephone line; a third transformer having a primary winding connected to said telephone line, and a secondary winding; a reception amplifier comprising third and fourth amplifying elements, said third amplifying element having a control electrode connected to said secondary winding; second circuit means connecting said third and fourth amplifying elements; a loudspeaker; a fourth transformer connecting said fourth amplifying element to said loudspeaker; a first photoconductive cell connecting the control electrode of said first amplifying element to the earth; a second photoconductive cell connecting the control electrode of said third amplifying element to the earth; first and second incandescent bulbs respectively positioned for directing their light on said first and second photoconductive cells; means, connected to said second circuit means, for controlling the operation of said first incandescent bulb; means, connected to said first circuit means for controlling the operation of said second incandescent bulb; a third photoconductive cell, connected to said first circuit means and positioned for receiving the light of said second light source; and a fourth photoconductive cell, connected in said second circuit means and positioned for receiving the light of said first light source.

4. A two-way telephone communication system comprising: a microphone; a first transformer having a primary winding connected to said microphone, and a secondary winding; a transmission amplifier comprising first and second amplifying elements, said first amplifying element having a control electrode connected to said secondary winding; first circuit means connecting said first amplifying element to said second amplifying element; a telephone line; a second transformer connecting said second amplifying element to said telephone line; a third transformer having a primary winding connected to said telephone line, and a secondary winding, a reception amplifier comprising third and fourth amplifying elements, said third amplifying element having a control electrode connected to said secondary winding; second circuit means connecting said third and fourth amplifying elements; a loudspeaker, a fourth transformer connecting said fourth amplifying element to said loudspeaker; a first photoconductive cell connecting the control electrode of said first amplifying element to the earth; a second photoconductive cell connecting the control electrode of said third amplifying element to the earth; first and second incandescent bulbs respectively positioned for directing their light on said first and second photoconductive cells; means, connected to said second circuit means, for controlling the operation of said first incandescent bulb; means, connected to said first circuit means for controlling the operation of said second incandescent bulb; a third photoconductive cell, connected to said first circuit means and positioned for receiving the light of said second light source; a fourth photoconductive cell, connected in said second circuit means and positioned for receiving the light of said first light source; a fifth photoconductive cell connected across the secondary winding of said first transformer and a sixth photoconductive cell connected across the secondary winding of said third transformer.

5. A two-way telephone communication system comprising: a microphone; a transmission amplifier comprising first and second amplifying elements, said first amplifying element having a control electrode connected to said microphone; first circuit means connecting said first amplifying element to said second amplifying element; a telephone line; a hybrid transformer connecting said second amplifying element to said telephone line, having a primary winding connected to said telephone line; a reception amplifier comprising third and fourth amplifying elements, said third amplifying element having a control electrode connected to said hybrid transformer; second circuit means connecting said third and fourth amplifying elements; a loudspeaker connected to said fourth amplifying element; a first photoconductive cell connecting the control electrode of said first amplifying element to the earth; a second photoconductive cell connecting the control electrode of said third amplifying element to the earth; first and second incandescent bulbs respectively positioned for directing their light on said first and second photoconductive cells; means, connected to said second circuit means, for controlling the operation of said first incandescent bulb; means, connected to said first circuit means for controlling the operation of said second incandescent bulb; a third photoconductive cell, connected to said first circuit means and positioned for receiving the light of said second light source; and a fourth photoconductive cell, connected in said second circuit means and positioned for receiving the light of said first light source.

References Cited by the Examiner

UNITED STATES PATENTS

| | | | |
|---|---|---|---|
| 3,046,354 | 7/1962 | Clemency | 179—81 |
| 3,168,619 | 2/1965 | Harrison | 179—1.4 |
| 3,202,905 | 8/1965 | Gomez | 323—74 |

KATHLEEN H. CLAFFY, *Primary Examiner.*

R. MURRAY, *Assistant Examiner.*